(No Model.)
S. NEWELL.
MILK PAN COVER.
No. 494,157. Patented Mar. 28, 1893.
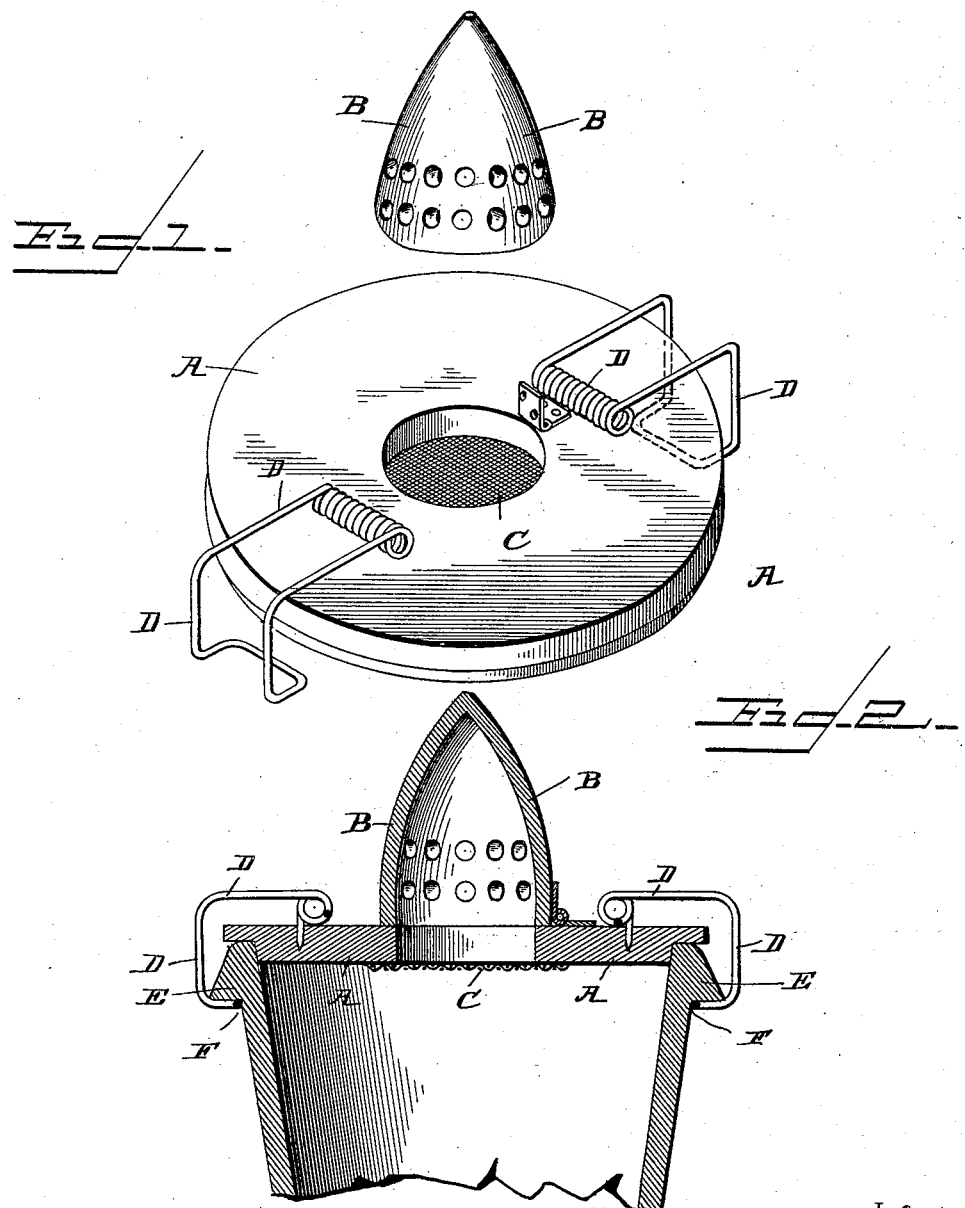
Witnesses
E. K. Stewart.
Alvan Macauley
Inventor
Sarah Newell,
By her Attorneys,
C. A. Snow & Co.

UNITED STATES PATENT OFFICE.

SARAH NEWELL, OF VERSAILLES, ILLINOIS, ASSIGNOR OF ONE-HALF TO MARGARET PEACOCK, OF SAME PLACE.

MILK-PAN COVER.

SPECIFICATION forming part of Letters Patent No. 494,157, dated March 28, 1893.

Application filed November 25, 1892. Serial No. 453,159. (No model.)

*To all whom it may concern:*

Be it known that I, SARAH NEWELL, a citizen of the United States, residing at Versailles, in the county of Brown and State of Illinois, have invented a new and useful Milk-Can Cover, of which the following is a specification.

My invention relates to an improved cover or lid for milk pans, crocks, &c., and has for its object to provide a cover which, while it securely protects the contents of the pan from the encroachments of prowling animals, and from dust and other deleterious matters, also permits of a perfect aeration of the contents of the pan or crock.

One feature of my invention is designed to obviate a fault which has been common to covers heretofore in use. I refer to the fact that when the ordinary tight cover is placed over a vessel containing a warm substance, such as fresh milk, the difference between the temperature inside the crock and that of the outside air is such as to cause the vapors arising from such milk, &c., to condense on said cover, whence it drops back into the contents of the pan to the injury thereof.

I have sought in my invention to construct a cover which shall be free from these objectionable features.

In the accompanying drawings: Figure 1 is a perspective view of my invention showing the perforated cone detached from the cover. Fig. 2 is a cross section of my cover as applied to a milk-pan.

Similar letters of reference in both the figures, indicate the same parts.

Referring to the drawings—the letter A indicates the cover proper made preferably of galvanized sheet-iron or of granite-ware, as is also the perforated cone B. The cover is centrally perforated as shown in Fig. 1. This perforation is guarded by the wire gauze C soldered or otherwise attached to the cover A. The perforated cone is hinged at one side so that it may be conveniently thrown back for cleaning purposes and prevents, the same from being removed entirely by cats or rats, and further it will be by said form of attachment, held in position on the cover, and so placed as to close the perforation C. I shall presently indicate the purposes of these improvements. The spring clamps D are designed to secure the cover to the crock, the hook-shaped ends of the springs engaging under the rim E of the crock F as shown in Fig. 2 of the drawings.

With the idea of making a dust-proof cover which would permit of a complete aeration of the contents of the pan, I perforate the cover at its center to permit of the escape of vapors and to give free access to the air. To keep cats, ants, and bugs generally out, I make use of the wire-gauze C guarding said perforation, but, this would not exclude dust, &c., which might fall from above, so I employ the hollow, perforated cone B, so that when any particles fall, they glance off from the inclined sides of said cone, at the same time there is nothing to interfere with the free egress of vapors and gases.

The advantages of my cover over those heretofore in use, are too apparent to require enumeration, but the main features are convenience in handling, and efficiency in performing those functions for which it was designed. It may readily be seen too, that immaterial changes of construction may be made without departing from the spirit of my invention.

Where, in this specification, I have spoken of "wire gauze," or "gauze fabric," it may readily be understood that any equivalent device may be substituted therefor, as for instance, open work or perforated sheet-metal.

Having thus described my invention, I claim as new and desire to secure by Letters Patent—

1. A lid of the class described comprising a cover having a central opening with a gauze fabric closing the same, and a hollow perforated cone hinged to said cover at one side of and arranged to close over the said central opening, substantially as described.

2. A lid of the class described, comprising the centrally perforated cover A, the gauze fabric closing said perforation, the hollow, perforated cone B, inclosing said fabric, and the hook-shaped spring clamps D for securing the lid to the vessel which it covers, substantially as described.

In testimony that I claim the foregoing as my own I have hereto affixed my signature in the presence of two witnesses.

SARAH $\overset{\text{her}}{\times}$ NEWELL.
mark

Witnesses:
 THOS. J. RUSSELL,
 ELISHA WHITTEN.